United States Patent
Tsutsui

(10) Patent No.: US 9,629,069 B2
(45) Date of Patent: Apr. 18, 2017

(54) COMMUNICATION DEVICE AND COMMUNICATION CONTROL METHOD

(71) Applicant: NEC Corporation, Tokyo (JP)

(72) Inventor: Takahiro Tsutsui, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 14/655,099

(22) PCT Filed: Dec. 20, 2013

(86) PCT No.: PCT/JP2013/084379
§ 371 (c)(1),
(2) Date: Jun. 24, 2015

(87) PCT Pub. No.: WO2014/103969
PCT Pub. Date: Jul. 3, 2014

(65) Prior Publication Data
US 2015/0327152 A1 Nov. 12, 2015

(30) Foreign Application Priority Data

Dec. 26, 2012 (JP) ................................. 2012-282262

(51) Int. Cl.
*H04M 11/04* (2006.01)
*H04W 48/06* (2009.01)
(Continued)

(52) U.S. Cl.
CPC ............. *H04W 48/06* (2013.01); *H04W 4/22* (2013.01); *H04W 28/0284* (2013.01);
(Continued)

(58) Field of Classification Search
CPC ... H04L 12/5692; H04L 47/122; H04W 28/08
(Continued)

(56) References Cited

U.S. PATENT DOCUMENTS 6,826,394 B1 11/2004 Raith et al.
7,864,727 B2 1/2011 Inayoshi et al.
(Continued)

FOREIGN PATENT DOCUMENTS

JP 2001523411 11/2001
JP 2006115291 4/2006
(Continued)

OTHER PUBLICATIONS

International Search Report, PCT/JP2013/084379, Mar. 11, 2014.
(Continued)

*Primary Examiner* — Thomas Lett
(74) *Attorney, Agent, or Firm* — Young & Thompson

(57) ABSTRACT

A communication device serving as a base station configured to notify a mobile station of a warning or an upper device of the base station includes a controller configured to shut down the warning, notified from the base station based on warning information, upon determining the congestion condition of the base station, and a communication part configured to transmit the information regarding a shutdown of warning. Herein, the controller compares a first threshold with a resource usage rate or the amount of resources in the base station, thus determining the congestion condition of the base station. Additionally, the controller compares a second threshold with the warning information so as to determine a shutdown of warning. The second threshold can be set based on the resource usage rate or the type of the base station.

6 Claims, 14 Drawing Sheets

(51) Int. Cl.
  *H04W 28/02* (2009.01)
  *H04W 68/00* (2009.01)
  *H04W 4/22* (2009.01)
  *H04W 28/12* (2009.01)
  *H04W 24/04* (2009.01)

(52) U.S. Cl.
  CPC ....... *H04W 28/0289* (2013.01); *H04W 28/12* (2013.01); *H04W 68/005* (2013.01); *H04W 24/04* (2013.01)

(58) Field of Classification Search
  USPC ............... 455/404.1, 405, 408; 370/229, 230
  See application file for complete search history.

(56) References Cited

U.S. PATENT DOCUMENTS

| | | | |
|---|---|---|---|
| 2006/0084445 A1 | 4/2006 | Minami et al. | |
| 2006/0159016 A1* | 7/2006 | Sagfors | H04L 47/12 370/230 |
| 2011/0171928 A1* | 7/2011 | Vikberg | G08B 27/005 455/404.1 |
| 2011/0176414 A1* | 7/2011 | De Franca Lima | H04L 47/12 370/230 |
| 2011/0310731 A1* | 12/2011 | Park | H04W 28/18 370/230 |
| 2014/0029420 A1* | 1/2014 | Jeong | H04L 12/5692 370/229 |
| 2014/0233390 A1* | 8/2014 | Schmid | H04L 47/125 370/236 |
| 2015/0146522 A1* | 5/2015 | Lau | H04W 76/00 370/230 |

FOREIGN PATENT DOCUMENTS

| | | |
|---|---|---|
| JP | 2007129544 | 5/2007 |
| JP | 200733626 | 12/2007 |

OTHER PUBLICATIONS

3GPP TR 23.041, Technical Realization of Cell Broadcast Service (CBS), Release 11, Version 11.4.0, Sep. 2012.
3GPP TS 36.331, Radio Resource Control (RRC) Protocol Specification, Release 11, Version 11.1.0, Sep. 2012.
3GPP TS 36.413, S1 Application Protocol (S1AP), Release 11, Version 11.1.0, Sep. 2012).
3GPP TR 22.968, V11.0.0, Sep. 2012, pp. 28-29.
Specification of Replace mechanism in Write-Replace Warning Request, 3GPP TSG-RAN WG3 Meeting #78, R3-122462, Nov. 2012, pp. 1-3.
Japanese Office Action dated Apr. 26, 2016, with English Translation; Application No. 2014-554428.
3rd Generation Partnership Project; Technical Specification Group Services and System Aspects; Study for requirements for a Public Warning System (PWS) service (Release 11) [online], 3GPP TR 22.968, V11.0.0, Sep. 21, 2012, pp. 23-29.

\* cited by examiner

FIG. 15

| RESOURCE USAGE RATE | SECOND THRESHOLD |
|---|---|
| LESS THAN 50% | 0 |
| EQUAL TO OR ABOVE 51%, LESS THAN 60% | 2 |
| EQUAL TO OR ABOVE 60%, LESS THAN 80% | 3 |
| EQUAL TO OR ABOVE 80% | 5 |

FIG. 16

| TYPE OF BASE STATION | SECOND THRESHOLD |
|---|---|
| MACRO | 0 |
| MICRO | 2 |
| PICO | 3 |
| FEMTO | 5 |

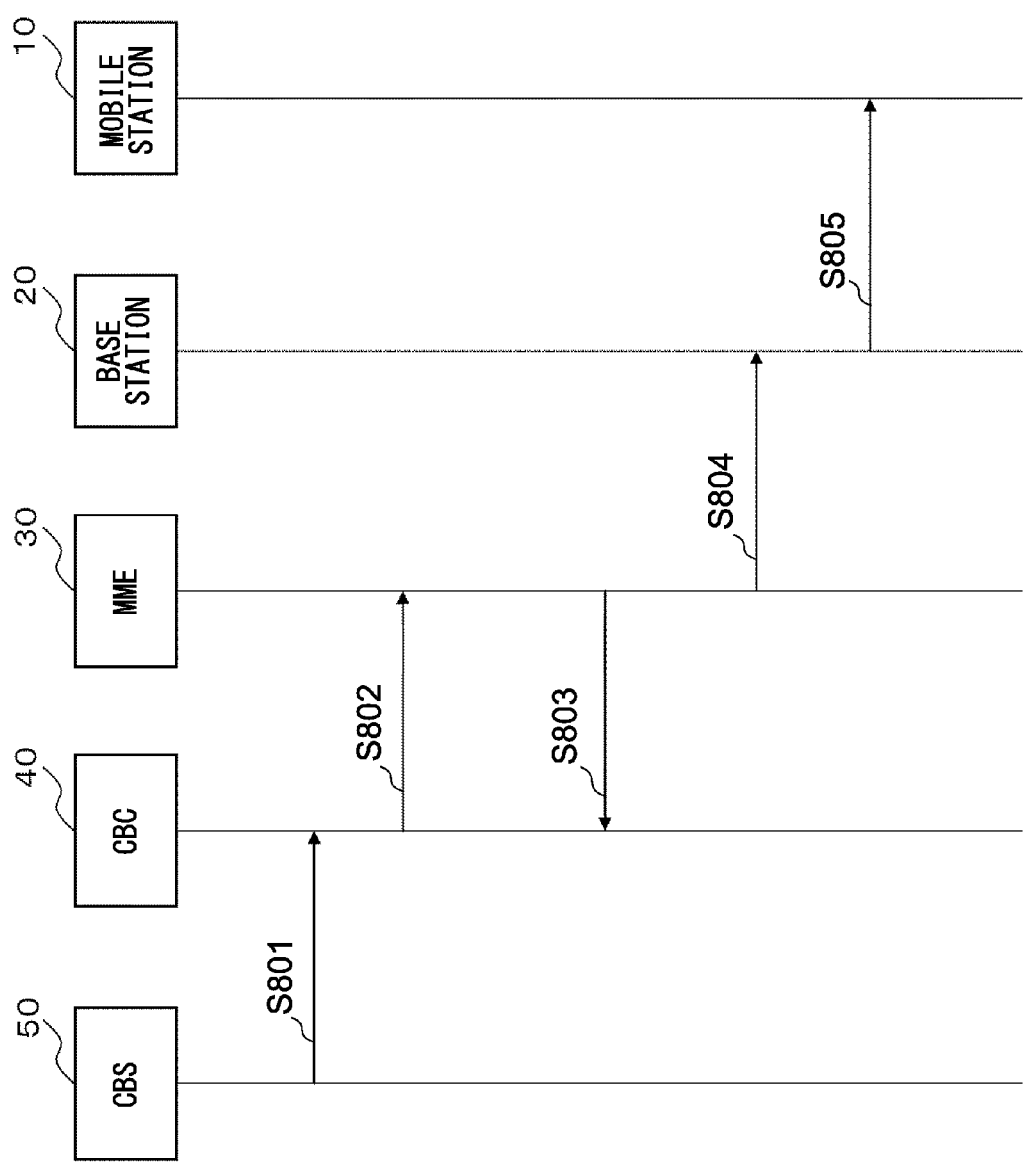

COMMUNICATION DEVICE AND COMMUNICATION CONTROL METHOD

TECHNICAL FIELD

The present invention relates to a communication device and a communication control method, which are applied to a warning system sending out a warning to a mobile station.

The present application claims priority on Japanese Patent Application No. 2012-282262 filed Dec. 26, 2012, the entire content of which is incorporated herein by reference.

BACKGROUND ART

Standardization organizations such as 3GPP (3rd Generation Partnership Project) have studied and standardized public warning systems (PWS) serving as infrastructures for transmitting emergency information. The PWS is provided with functions of sending out warnings (warning notifications or alerts) to a plurality of mobile stations or user equipment (UE). Herein, the PWS can be classified into earthquake and tsunami warning systems (ETWS) and commercial mobile alert systems (CMAS).

Non-Patent Literature Document 1 discloses a sequence of sending out warnings with the CMAS. The sequence of sending out warnings with the CMAS will be described with reference to FIG. 17. First, a CBS (Cell Broadcast Service) 50 provides a CBC (Cell Broadcast Center) 40 with warning content, a broadcasting area, and a broadcasting period by use of an emergency broadcast request message (step S801). Based on the broadcasting area received from the CBS 50, the CBC 40 specifies a mobility management entity (MME) 30 configured to transmit a write-replace warning request. The CBC 40 provides the MME 30 with the warning content, the broadcasting area, and the broadcasting period by use of a write-replace warning request message (step S802). The MME 30 provides the CBC 40 with a write-replace warning response message indicating receipt of the warning content, the broadcasting area, and the broadcasting period (step 803).

Based on the broadcasting area received from the CBC 40, the MME 30 specifies a base station (i.e. eNode B) 20 configured to broadcast warnings. It provides the base station 20 with the warning content, the broadcasting area, and the broadcasting period by use of a write-replace warning request message (step S804). The base station 20 specifies a cell used to broadcast warnings based on the broadcasting area received from the MME 30. The base station 20 provides a mobile station 10, located in the cell, with the warning content by use of a system information block (SIB) of a broadcast control channel (BCCH) (step S805). Herein, the base station 20 broadcasts a plurality of warnings to the mobile station 10 in a time-division manner. The mobile station 10 receives a warning transmitted from the base station 20. Non-Patent Literature Document 2 discloses a technology of sending out a warning divided into a plurality of segments. Non-Patent Literature Document 3 defines a repetition period as a broadcasting period of warning being broadcast from the base station 20 to the mobile station 10, wherein it is set that the repetition period ranges from one second to 409 seconds.

CITATION LIST

Non-Patent Literature Document

Non-Patent Literature Document 1: 3GPP TR 23.041, "Technical Realization of Cell Broadcast Service (CBS) (Release 11)", Version 11.4.0 (2012.09)

Non-Patent Literature Document 2: 3GPP TS 36.331, "Radio Resource Control (RRC) Protocol Specification (Release 11)", Version 11.1.0 (2012.09)

Non-Patent Literature Document 3: 3GPP TS 36.413, "S1 Application Protocol (S1AP) (Release 11)", Version 11.1.0 (2012.09)

SUMMARY OF INVENTION

Technical Problem

As described above, the PWS is designed to periodically broadcast warnings, but the increased number of warnings may increase the rates of resources used for broadcasting warnings among all resources in each base station, thus reducing the rates of resources used for data communication. In this case, it is impossible for each base station to efficiently use resources.

The present invention is created in consideration of the above problems, and therefore it is an object of the invention to provide a communication device and a communication control method which can efficiently use resources in each base station in response to a warning output from a mobile alert system.

Solution to Problem

A first embodiment of the present invention is directed to a communication device serving as a base station configured to provide a warning to a mobile station or an upper device of the base station. The communication device includes a controller configured to determine a shutdown of warning provided by the base station based on warning information upon determining a congestion condition of the base station, and a control part configured to transmit information regarding a shutdown of warning. The controller determines whether the base station is in the congestion condition by comparing a first threshold with a resource usage rate or the amount of resources in the base station.

A second embodiment of the present invention is directed to a communication control method adapted to a communication device serving as a base station configured to provide a warning to a mobile station or an upper device of the base station. The communication control method includes the steps of: determining whether or not the base station is in a congestion condition; determining a shutdown of warning provided by the base station based on warning information when the base station is in the congestion condition; and transmitting information regarding the shutdown of warning. The communication control method determines whether or not the base station is in the congestion condition by comparing a first threshold with a resource usage rate or the amount of recourses in the base station.

Advantageous Effects of Invention

According to the present invention, it is possible to efficiently use resources in each base station even when the number of warnings output from each communication system is increased; hence, it is possible to reliably provide each mobile station with warnings having a high degree of emergency.

BRIEF DESCRIPTION OF DRAWINGS

FIG. 15 is a table showing the relationship between a second threshold and a resource usage rate of a base station according to the fifth embodiment of the present invention.

FIG. 16 is a table showing the relationship between a second threshold and a type of a base station according to the sixth embodiment of the present invention.

FIG. 17 is a sequence diagram showing a procedure of annunciating warnings with a CMAS in a communication system.

DESCRIPTION OF EMBODIMENTS

The communication device and the communication control method according to the present invention will be described in detail by way of examples with reference to the drawings.

First Embodiment

Figure 1:
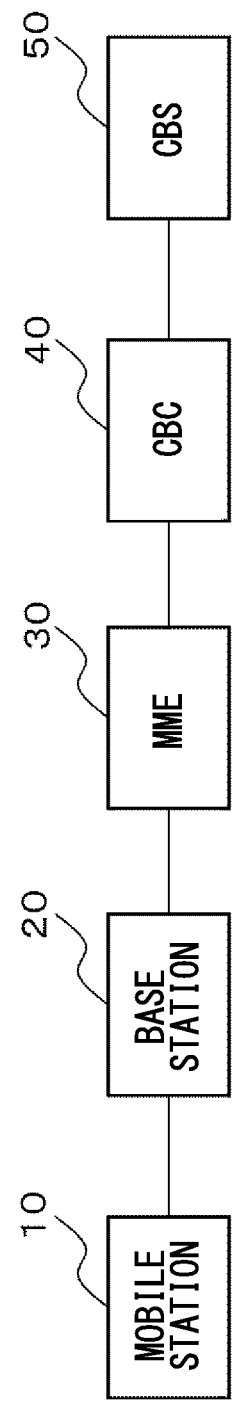
FIG. 1 is a block diagram showing a communication system adopting a communication device and a communication control method according to the present invention.

FIG. 1 is a block diagram showing a communication system (or a warning system) adopting a communication device and a communication control method according to the present invention. The communication system includes a mobile station 10, a base station 20, an MME 30, a CBC 40, and a CBS 50. FIG. 1 shows a single mobile station 10, but it is possible to connect a plurality of mobile stations 10 to the base station 20. FIG. 1 shows a single MME 30, but it is possible to connect a plurality of MMEs 30 to the base station 20. The first embodiment of the present invention is applied to the configuration and the operation of the base station 20 and the MME 30.

Figure 2:
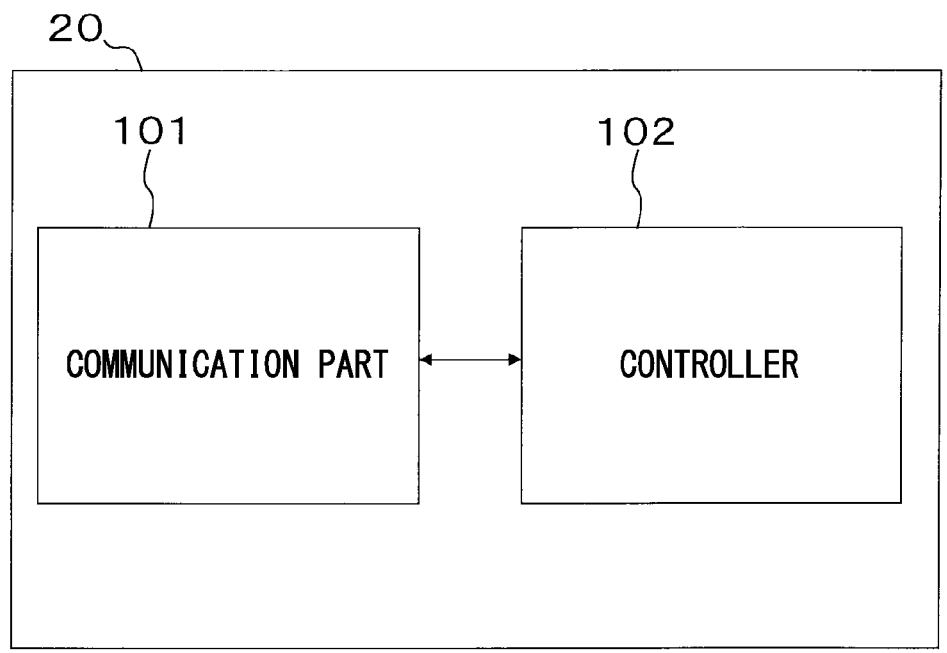
FIG. 2 is a block diagram of a base station according to the first embodiment of the present invention.

FIG. 2 is a block diagram of the base station 20 according to the first embodiment. The base station 20 includes a communication part 101 and a controller 102. The communication part 101 receives or transmits control signals or data with the MME 30 via an S1 interface. The controller 102 measures a resource usage rate of the base station 20 during the predetermined period. For example, the resource usage rate indicates a rate of the currently used resources among all available resources in the base station 20. Next, the controller 102 compares the resource usage rate of the base station 20 with a first threshold received from an upper device such as the MME 30. The controller 102 determines that the base station 20 is in the congestion condition when the resource usage rate of the base station 20 is equal to or above the first threshold. The controller 102 transmits a first control signal, representing the congestion condition of the base station 20, to the MME 30 through the communication part 101. Additionally, the base station 20 communicates with the mobile station 10 via a wireless link. For example, the base station 20 carries out warning notification and data communication with the mobile station 10. As the resource usage rate measured by the controller 102, for example, it is possible to name the transmission power of the base station 20, frequency resources used to transmit control signals or data (e.g. the usage rate of PRB (Physical Resource Block) in U-Plane or C-Plane), time resources such as transmission opportunities, the number of users connected to the base station 20, the number of the established RAB (Radio Access Bearer), etc.

In the above, the controller 102 transmits a first control signal to the MME 30 in the congestion condition of the base station 20; but this is not a restriction. For example, the controller 102 may periodically transmit first control signals to the MME 30. Alternatively, the controller 102 may transmit a first control signal to the MME 30 in response to any triggers other than the congestion condition of the base station 20. It is possible to discriminate the status of each first control signal between the case where the controller 102 periodically transmits a first control signal to the MME 30 and the case where the controller 102 transmits a first control signal to the MME 30 in response to any triggers other than the congestion condition of the base station 20. For example, the status of a first control signal in the congestion condition of the base station 20 is set to "1" while the status of a first control signal in the non-congestion condition of the base station 20 is set to "0".

In the above, the controller 102 determines the congestion condition of the base station 20 through comparison between the resource usage rate and the first threshold indicating the resource rate; but this is not a restriction. For example, it is possible to compare the absolute amount of the currently used resources with the first threshold representing the absolute amount of resources. Alternatively, it is possible for the base station 20 to store the first threshold since it is unnecessary for the upper device such as the MME 30 to set the first threshold. In this case, the upper device may set the first threshold once the base station 20 starts its operation. Alternatively, it is possible for the upper device to set the first threshold when the base station 20 starts each individual communication. The controller 102 may transmit a first control signal to the MME 30 by use of the existing S1-AP message such as a write-replace warning response message. Alternatively, the controller 102 may transmit a first control signal to the MME 30 by use of a new message.

Figure 3:
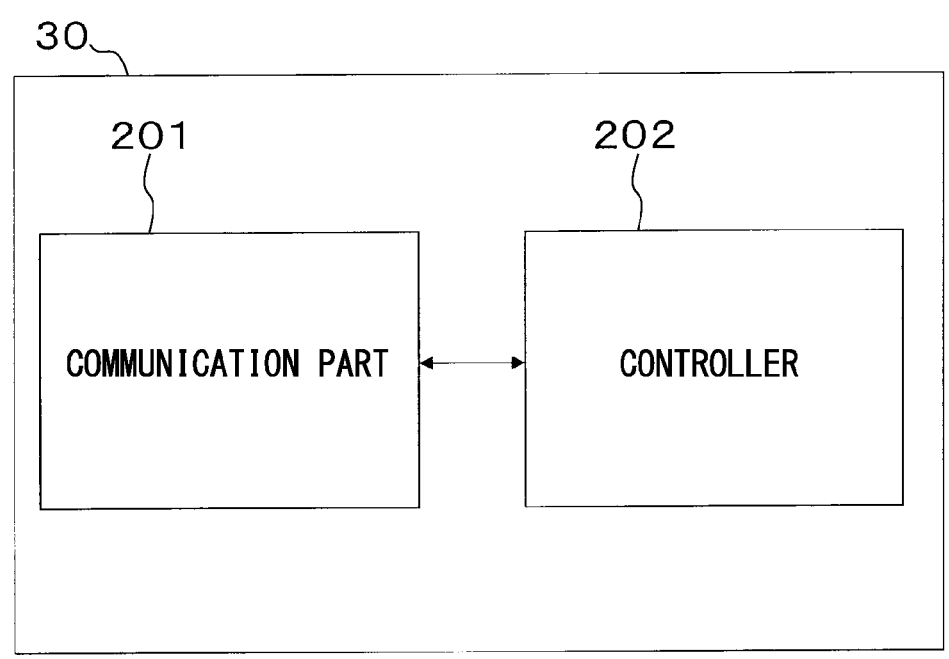
FIG. 3 is a block diagram of an MME according to the first embodiment of the present invention.

FIG. 3 is a block diagram of the MME 30 according to the first embodiment. The MME 30 includes a communication part 201 and a controller 202. The communication part 201 transmits or receives control signals or data with the base station 20 via an S1 interface. The controller 202 determines a shutdown of warning when the MME 30 receives a first control signal from the base station 20. The controller 202 transmits a second control signal, representing a shutdown of warning, to the base station 20 through the communication part 201. The controller 202 determines a shutdown of warning based on the predetermined condition satisfied between warning information and a second threshold. The upper device such as the CBC 40 determines the warning information and the second threshold. Herein, the warning information may refer to a priority on an emergency of warning.

Additionally, the predetermined condition may refer to the relationship of magnitudes between the warning information and the second threshold. Alternatively, the predetermined condition may indicate whether a priority on an emergency of warning, serving as the warning information, is less than the second threshold. In this case, the controller 202 determines the warning shutdown when a priority of warning is less than the second threshold.

The warning information may refer to a priority of a company having contracts regarding warning notices (e.g. a company which utilizes warning notices for commercial purposes such as advertisements). For example, it is possible to shut down a warning having a second threshold "3" with respect to a company having a priority "2". Additionally, the warning information can be set to the transmission period of warning. In this case, the controller 202 determines to shut down a warning with the transmission period equal to or above the second threshold satisfying the predetermined condition. For example, the controller 202 shuts down a warning with the transmission period of 100 seconds above the second threshold of 80 seconds. After determining the warning shutdown, the controller 202 transmits a second control signal, i.e. the information regarding a shutdown of warning (e.g. an identifier being set for each warning), to the base station 20 through the communication part 201. As described above, the first control signal may be periodically transmitted to the MME 30, or the first control signal may be transmitted to the MME 30 in response to any triggers other than the congestion condition. In this case, the controller 202 may starts a process of determining warning shutdown depending on the status of the first control signal (e.g. a status "1" indicating the congestion condition, or a status "2" indicating the non-congestion condition).

In the above, the upper device such as the CBC 40 sets the warning information and the second threshold; but this is not a restriction. It is possible for the MME 30 to store the warning information and the second threshold in advance by itself. Additionally, it is possible for the upper device to set the warning information and the second threshold when the MME 30 starts its operation. Alternatively, it is possible to set the warning information and the second threshold when the MME 30 starts each individual communication. As shown in FIG. 1, the MME 30 communicates with the CBC 40. The MME 30 is a node configuring a core network. The core network is configured of the CBC 40 and the CBS 50 other than the MME 30. It is possible to transmit the second control signal, i.e. the information regarding a shutdown of warning (e.g. an identifier being set for each warning), by use of the existing 51-AP message such as a write-replace warning request message.

Alternatively, it is possible to transmit the second control signal by use of a new message.

Figure 4:
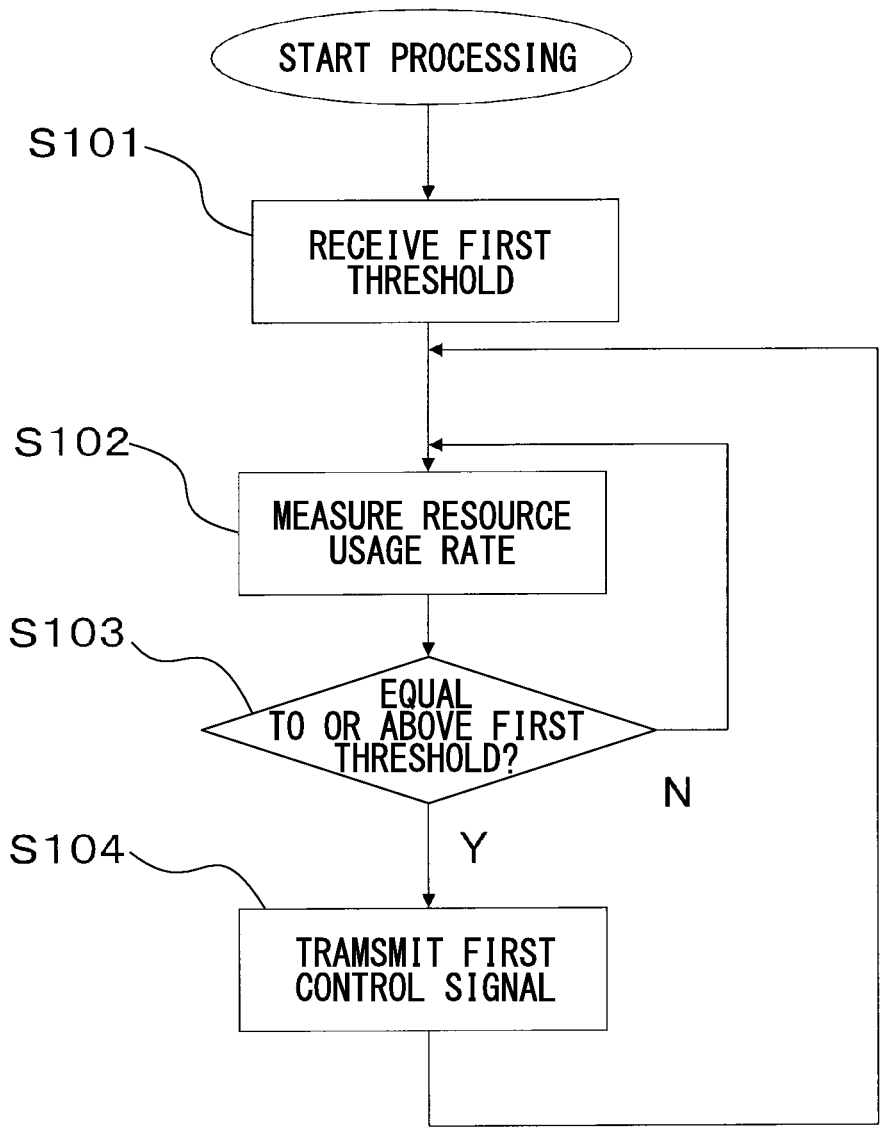
FIG. 4 is a flowchart showing the operation of the base station according to the first embodiment.

Next, the operation of the base station 20 according to the first embodiment will be described with reference to FIG. 4. First, the base station 20 receives a first threshold from the upper device such as the MME 30 in order to determine the congestion condition (step S101). The base station 20 measures the resource usage rate thereof (step S102). The base station 20 compares the resource usage rate with the first threshold (step S103). The base station 20 determines the congestion condition when the resource usage rate is equal to or above the first threshold (i.e. a decision result "Y" of step S103). In this case, the base station 20 transmits the first control signal, indicating the congestion condition, to the MME 30 (step S104). The flow returns to step S102 when the resource usage rate is less than the first threshold (i.e. a decision result "N" of step S103).

Figure 5:
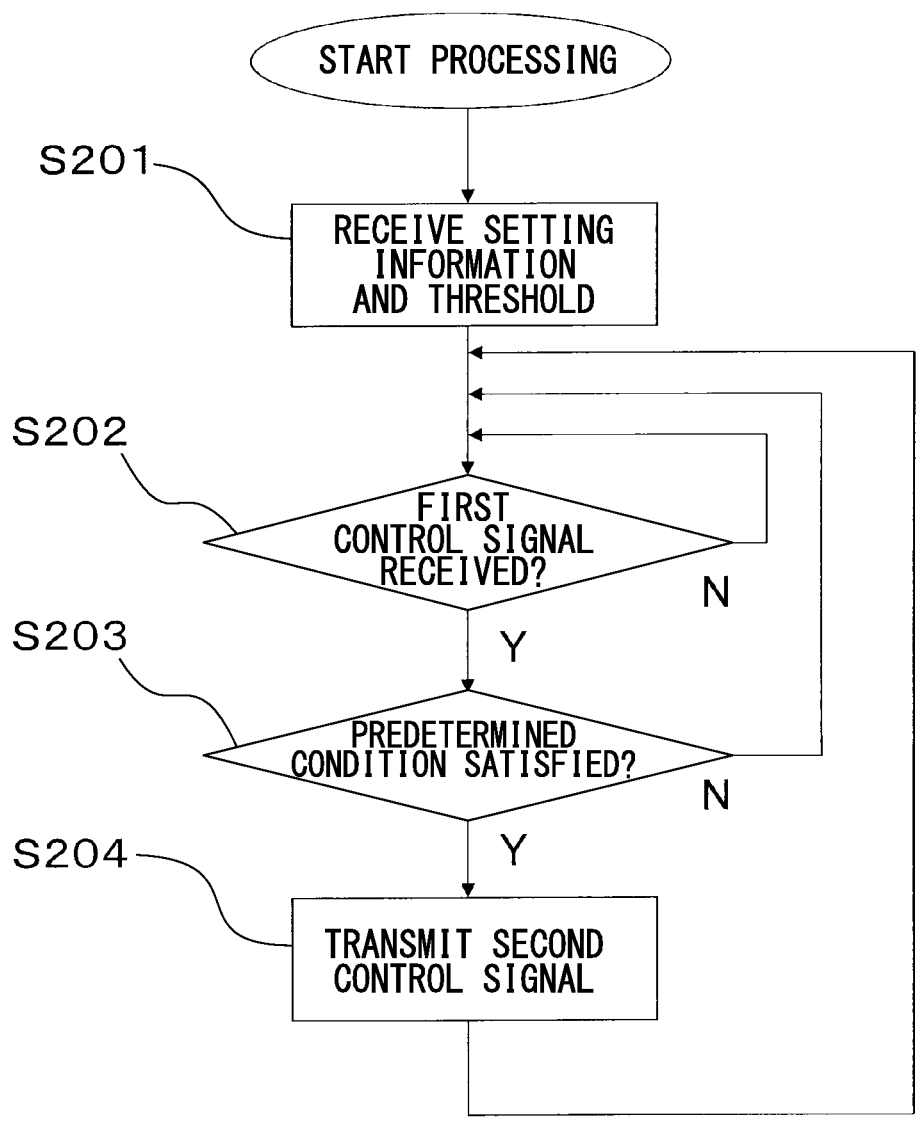
FIG. 5 is a flowchart showing the operation of the MME according to the first embodiment.

Next, the operation of the MME 30 of the first embodiment will be described with reference to FIG. 5. First, the MME 30 receives the warning information and the second threshold from the upper device such as the CBC 40 in order to determine the warning shutdown (step S201). Next, the MME 30 determines whether or not to receive the first control signal from the base station 20 (step S202). Upon receiving the first control signal from the base station 20 (i.e. a decision result "Y" of step S202), the MME 30 determines whether the warning information and the second threshold satisfy the predetermined condition (step S203). When the warning information and the second threshold satisfy the predetermined condition (i.e. a decision result "Y" of step S203), the MME 30 determines to shut down the warning so as to transmit the second control signal, representing the information of the warning shutdown, to the base station 20 (step S204). Without receiving the first control signal (i.e. a decision result "N" of step S202), the flow returns to step S202. When the warning information and the second threshold do not satisfy the predetermined condition (i.e. a decision result "N" of step S203), the flow returns to step S202. In the above description, the MME 30 determines a shutdown of warning when the warning information and the second threshold satisfy the predetermined condition; but it is possible to determine a partial shutdown of warning without shutting down all the warnings satisfying the predetermined condition.

Figure 6:
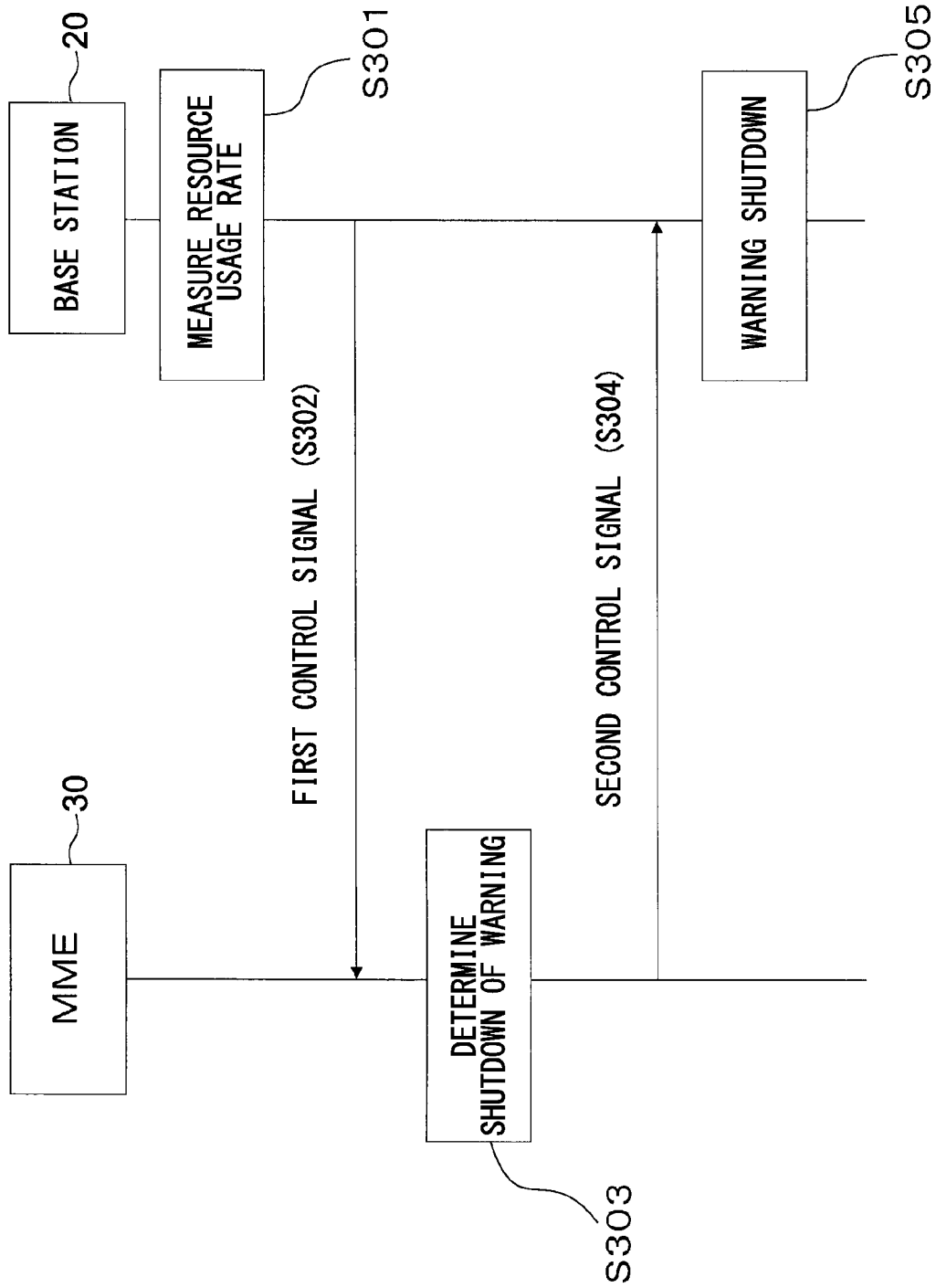
FIG. 6 is a sequence diagram showing the operation of the communication system according to the first embodiment.

FIG. 6 is a sequence diagram showing the operation of the communication system (i.e. the base station 20 and the MME 30). The base station 20 measures the resource usage rate thereof and compares the resource usage rate with the first threshold, thus determining whether the base station 20 is in the congestion condition (step S301). The base station 20 transmits the first control signal to the MME 30 when it determines the congestion condition thereof (step S302). Upon receiving the first control signal from the base station 20, the MME 30 determines the warning shutdown (step S303). The MME 30 transmits the second control signal, i.e. the information regarding a shutdown of warning (e.g. an identifier being set for each warning), to the base station 20 (step S304). The base station 20 shuts down the warning based on the second control signal (step S305). Thereafter, the mobile station 10 receives a warning provided by the base station 20 after completion of a communication control between the MME 30 and the base station 20.

As described above, the MME 30 of the first embodiment is able to determine whether or not to shut down a warning based on warning information when the base station 20 is in the congestion condition. As a shutdown of warning, it is possible to select a warning having a low priority or a warning having a long time elapsed from the start timing of transmitting the warning. Thus, the first embodiment can efficiently use resources of the base station 20 since the base station 20 can use resources, regarding warning shutdown, for data communication.

Second Embodiment

Next, a communication system according to the second embodiment of the present invention (i.e. the base station 20 and the MME 30) will be described. Compared to the first embodiment, the controller 102 of the base station 20 according to the second embodiment further includes a resource usage rate calculation part 103 and a congestion condition calculation part 104 while the controller 202 of the MME 30 according to the second embodiment further includes a warning shutdown determination part 203 and a storage unit 204. Hereinafter, differences between the first embodiment and the second embodiment will be described.

Figure 7:
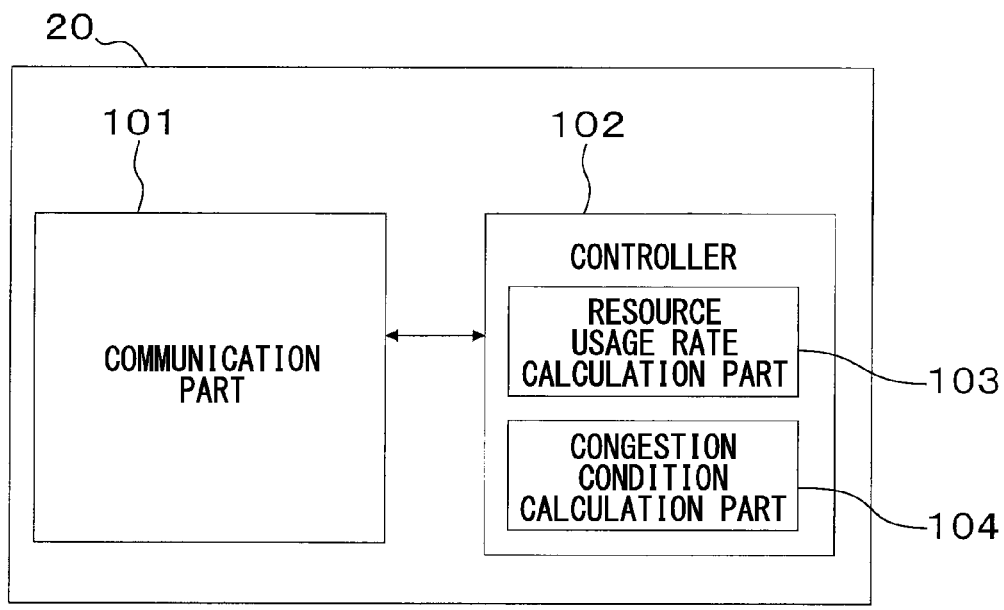
FIG. 7 is a block diagram of a base station according to the second embodiment of the present invention.

FIG. 7 is a block diagram of the base station 20 according to the second embodiment. The controller 102 of the base station 20 includes a resource usage rate calculation part 103 and a congestion condition calculation part 104. The resource usage rate calculation part 103 calculates a resource usage rate for each warning in the congestion condition of the base station 20. The congestion condition calculation part 104 calculates the amount of resources that should be reduced due to warning shutdown when it is determined that the base station 20 is in the congestion condition. The controller 102 transmits a first control signal, representing the resource usage rate for each warning and the amount of resources to be reduced due to warning shutdown, to the MME 30 through the communication part 101.

In the above, the resource usage rate calculation part 104 may calculate the amount (or the absolute amount) of resources being used for each warning instead of the resource usage rate for each warning. Additionally, it is possible to employ a resource rate or an absolute amount as the amount of resources to be reduced due to warning shut down, which is calculated by the congestion condition calculation part 104. To calculate the resource rate, the congestion condition calculation part 104 subtracts a first threshold representing the resource rate from the resource usage rate of the base station 20 so as to calculate the rate of resources to be reduced due to warning shutdown. To calculate the absolute amount, the congestion condition calculation part 104 subtracts a first threshold representing the absolute amount of resources from the amount of resources of the base station 20 so as to calculate the absolute amount of resources to be reduced due to warning shutdown. Alternatively, the congestion condition calculation part 104 subtracts a first threshold representing the resource rate from the resource usage rate of the base station 20 and then multiplies the subtraction result by the total amount of resources available in the base station 20, thus calculating the absolute amount of resources to be reduced due to warning shutdown.

Figure 8:
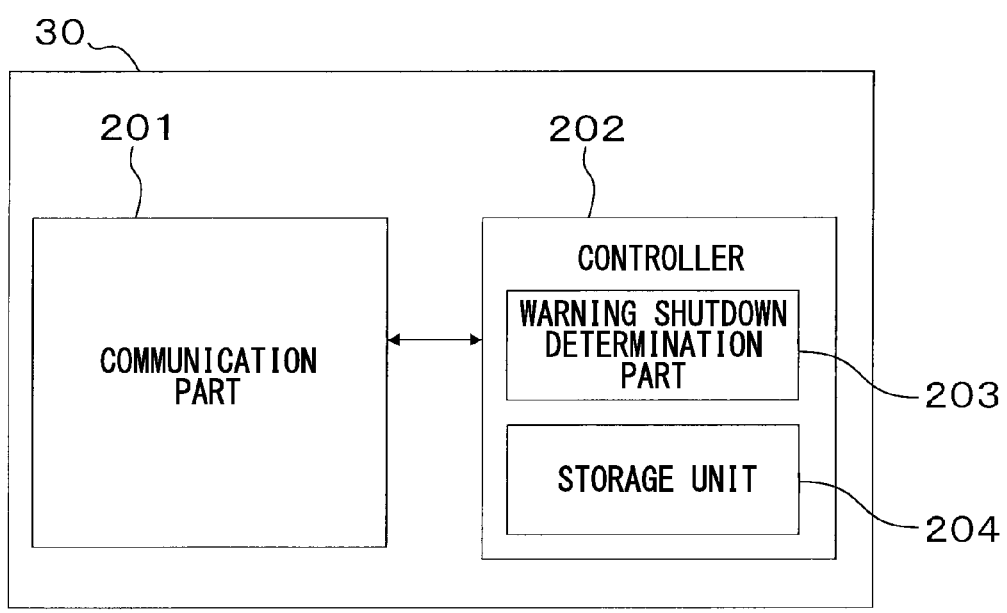
FIG. 8 is a block diagram of an MME according to the second embodiment of the present invention.

FIG. 8 is a block diagram of the MME 30 according to the second embodiment. The MME 30 includes a warning shutdown determination part 203 and a storage unit 204. The storage unit 204 stores the setting information of warnings (e.g. parameters set for warnings, or warning information described in the first embodiment) provided by the base station 20. The warning shutdown determination part 203 determines a shutdown of warning, among candidates of warning subjected to shutdown and satisfying the predetermined condition in terms of the warning information and the second threshold, based on the resource usage rate for each warning, the amount of reduced resources, and the setting information. For example, it is possible to select candidates of warning subjected to shutdown having a lower priority with reference to the warning information, and therefore it is necessary to stop selecting candidates of warning subjected to shutdown after achieving the amount of reduced resources in the base station 20.

Figure 9:
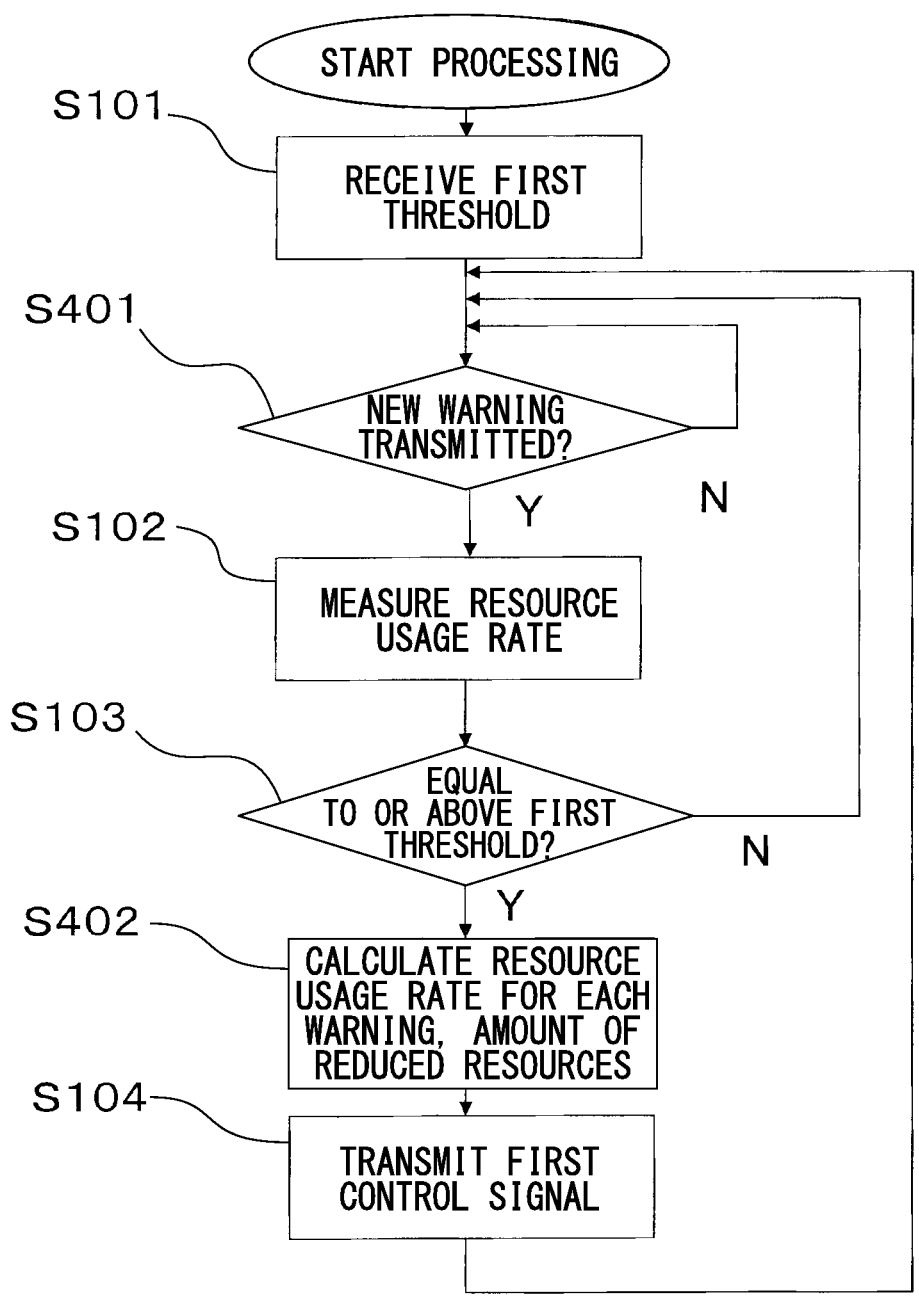
FIG. 9 is a flowchart showing the operation of the base station according to the second embodiment.

Next, the operation of the base station 20 according to the second embodiment will be described with reference to FIG. 9. FIG. 9 includes the same steps as steps S101, S102, S103, and S104 in FIG. 4. In the second embodiment, the base station 20 is triggered by the upper device transmitting a new warning (S401) so as to measure a resource usage rate (step S102). When it is determined that the base station 20 is in the congestion condition (i.e. a decision result "Y" of step S103), the base station 20 calculates a resource usage rate for each warning and the number of resources to be reduced due to warning shutdown (step S402). The base station 20 transmits a first control signal representing the resource usage rate and the amount of reduced resources to the MME 30 (step S104). The second embodiment operates such that the base station 20 is triggered by a new warning transmitted thereto so as to measure the resource usage rate. Due to a warning subjected to shutdown, it is possible to add another condition for measuring the resource usage rate that the upper device is transmitting one or more warnings.

Figure 10:
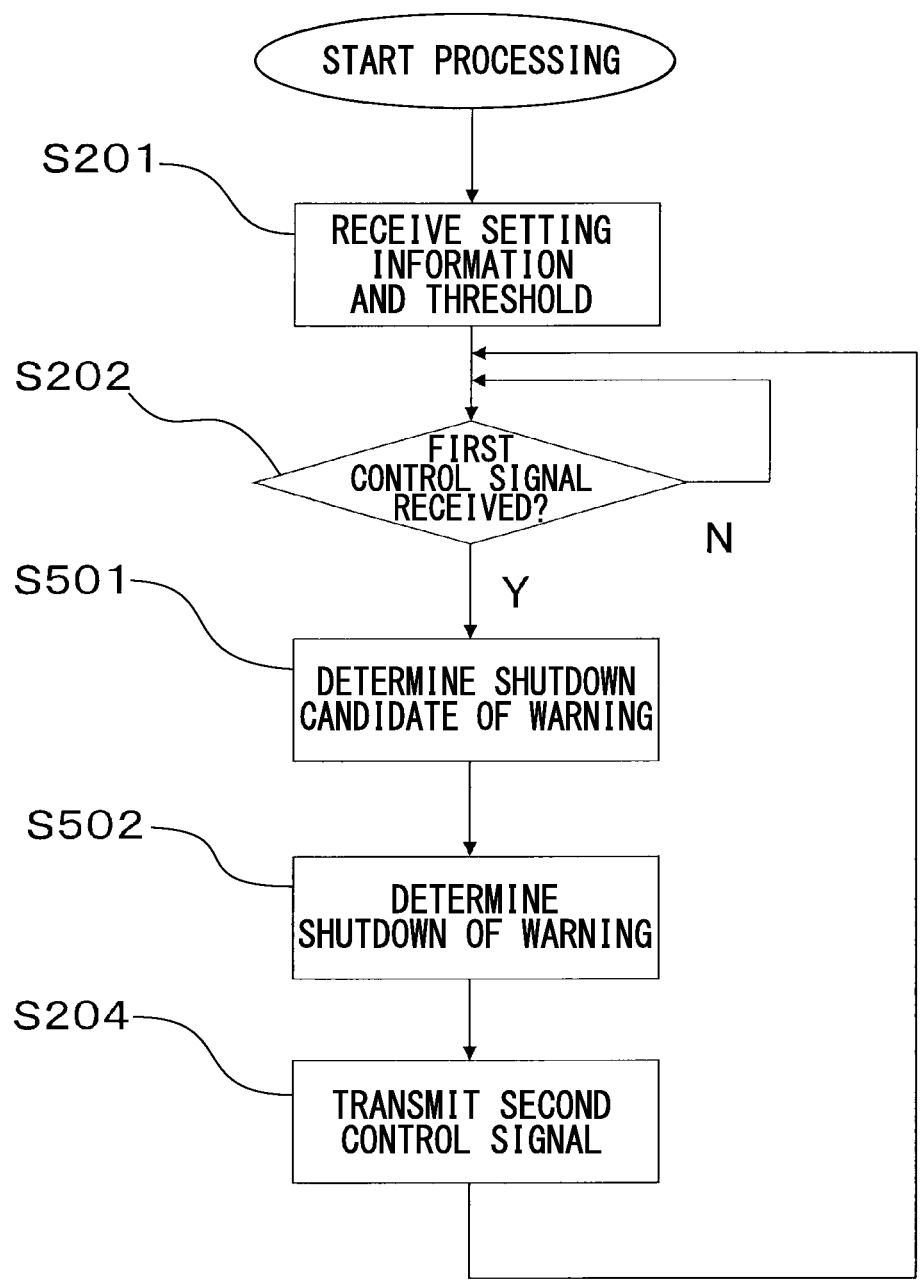
FIG. 10 is a flowchart of the MME according to the second embodiment.

Next, the operation of the MME 30 according to the second embodiment will be described with reference to FIG. 10. FIG. 10 includes the same steps as steps S201, S202, and S204 in FIG. 5. The MME 30 receives a first control signal, representing the resource usage rate for each warning and the amount of resources to be reduced due to warning shutdown, from the base station 20 (step S202). The MME 30 determines candidates of warning subjected to shutdown through a comparison between the warning information and the second threshold (step S501). The MME 30 determines a shutdown of warning among candidates of warning subjected to shutdown based on the resource usage rate for each warning, the amount of reduced resources, and the setting information (step S502).

As described above, the base station 20 of the second embodiment is triggered by a new warning transmitted thereto so as to measure the resource usage rate; but this is not a restriction. For example, it is possible to use another trigger of measuring the resource usage rate such as another communication other than warnings (e.g. a communication of specific data, reception and transmission of a control signal). Alternatively, the base station 20 may measure the resource usage rate for each period of transmission. Accordingly, it is possible to prevent warnings from being shut down with more than the amount of reduced resources since the MME 30 of the second embodiment determines a shutdown of warning based on the amount of reduced resources. Compared with the first embodiment, the second embodiment can efficiently use resources in the base station 20.

Third Embodiment

In the first and second embodiments, the base station 20 detects the congestion condition while the MME 30 determines a shutdown of warning. In the third embodiment, the base station 20 detects the congestion condition while determining a shutdown of warning. Hereinafter, the feature of the third embodiment compared to the first and second embodiment will be described.

Figure 11:
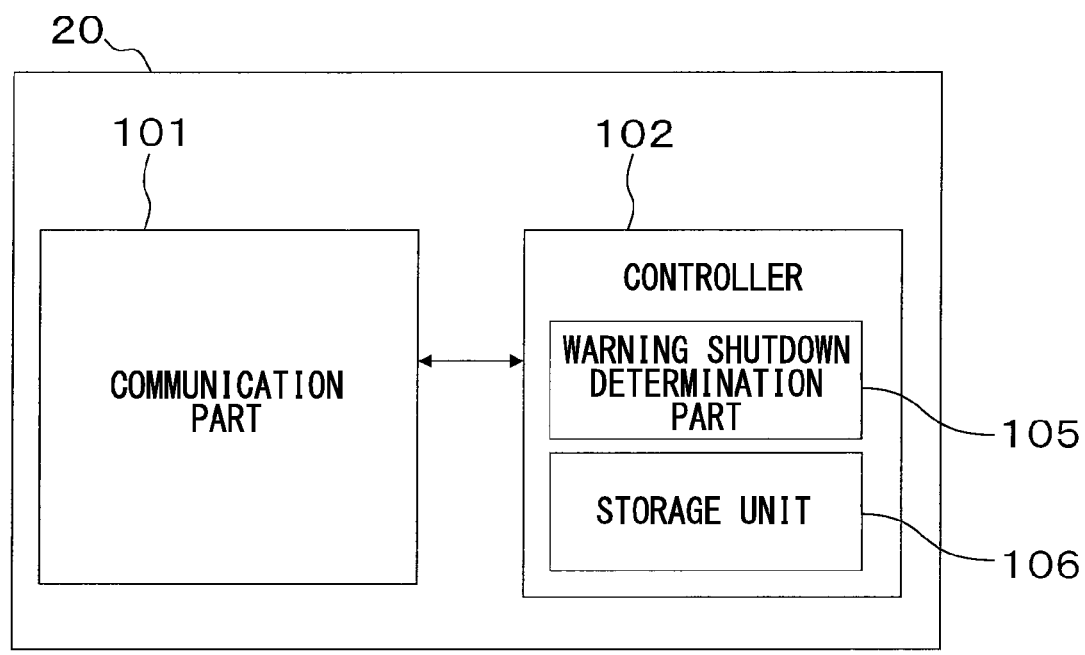
FIG. 11 is a block diagram of a base station according to the third embodiment of the present invention.

FIG. 11 is a block diagram of the base station 20 according to the third embodiment of the present invention. The base station 20 of the third embodiment includes a communication part 101 and a controller 102, wherein the controller 102 further includes a warning shutdown determination part 105 and a storage unit 106. Similar to the first and second embodiments, the base station 20 of the third embodiment measures a resource usage rate so as to compare the resource usage rate with a first threshold. It is determined that the base station 20 is in the congestion condition when the resource usage rate of the base station 20 is equal to or above the first threshold. The warning shutdown determination part 105 determines a shutdown of warning when it is determined that the base station 20 is in the congestion condition. It is possible for the third embodiment to employ the same method of determining a shutdown of warning as the first embodiment. That is, it is possible to determine a shutdown of warning through a comparison between the second threshold and the warning information representing a priority on an emergency of warning. The storage unit 106 stores the setting information of warnings provided by the base station 20 (e.g. parameters of warnings or the warning information described in the first embodiment). Additionally, the controller 102 of the base station 20 of the third embodiment may further include the resource usage rate calculation part 103 and the congestion condition calculation part 104 included in the controller 102 (see FIG. 7) described in the second embodiment. In this case, the warning shutdown determination part 105 of the base station 20 determines a shutdown of warning in consideration of the resource usage rate for each warning and the amount of resources to be reduced due to warning shutdown.

Figure 12:
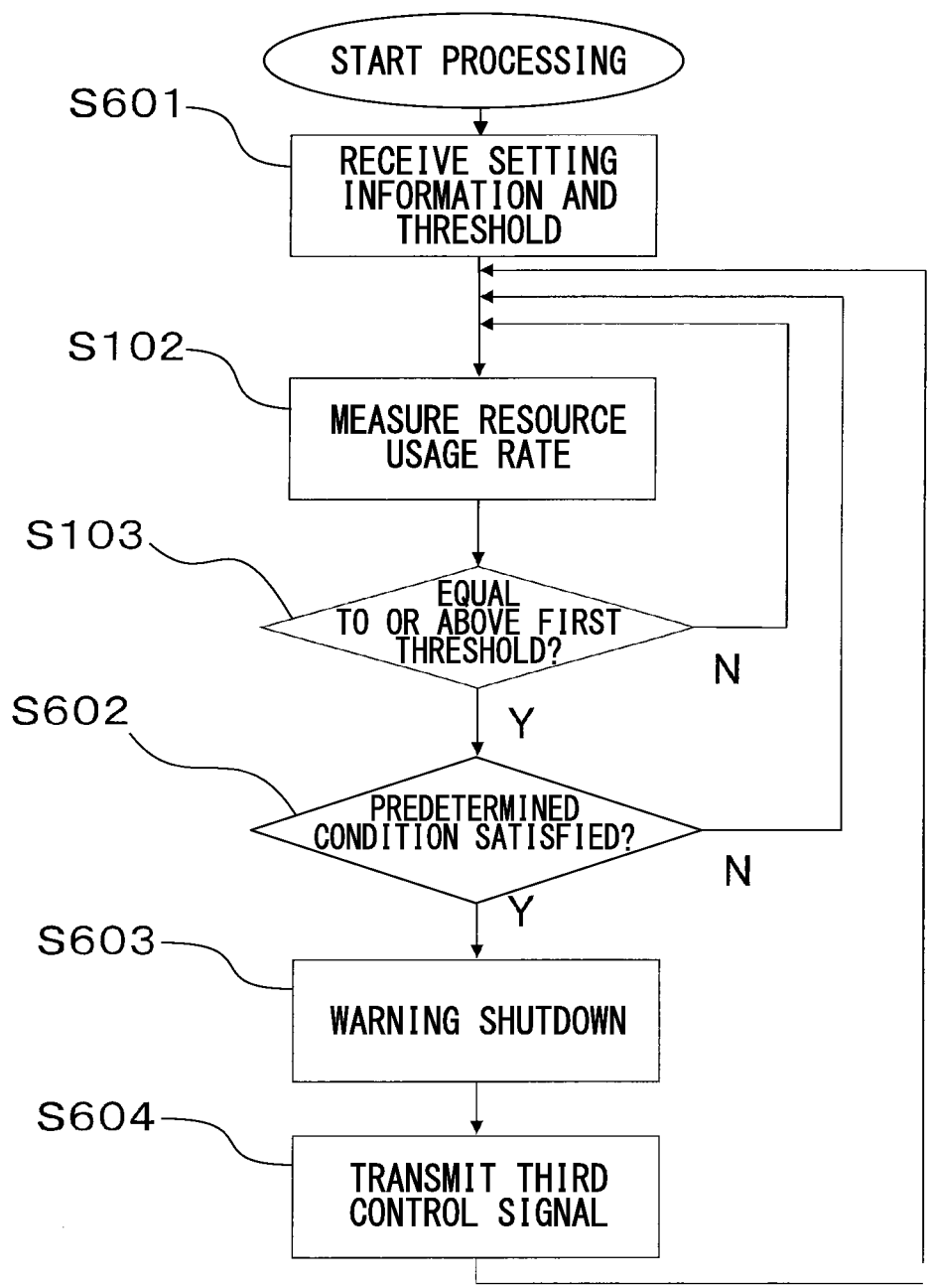
FIG. 12 is a flowchart showing the operation of the base station according to the third embodiment.

Next, the operation of the base station 20 of the third embodiment will be described with reference to FIG. 12. FIG. 12 includes the same steps as steps S102 and S103 in FIG. 4. The base station 20 of the third embodiment detects the congestion condition while determining a shutdown of warning, and therefore the base station 20 receives the warning information (or the setting information), the first threshold, and the second threshold from the upper device such as the MME 30 in step S601. It is possible for the upper device to determine the setting information once the base station 20 starts its operation. Alternatively, it is possible to determine the setting information when starting each individual communication. The base station 20 measures a resource usage rate in step S102, and then the base station 20 determines the congestion condition through a comparison between the resource usage rate and the first threshold in step S103. Upon determining the congestion condition of the base station 20, the base station 20 determines whether the warning information and the second threshold satisfy the predetermined condition with respect to the currently provided warning (step S602). The base station 20 stops providing a warning (step S603) when the warning information and the second threshold satisfy the predetermined condition (i.e. a decision result "Y" of step S602). Additionally, the base station 20 transmits a third control signal, i.e. the information regarding a warning subjected to shutdown (e.g. an identifier of warning), to the MME 30 (step S604). The flow returns to step S102 when the base station 20 does not provide any warning satisfying the predetermined condition in terms of the warning information and the second threshold (i.e. a decision result "N" of step S602). It is possible to transmit the third control signal by use of the existing S1-AP message such as a write-replace warning response message or a new message.

Since the base station 20 of the third embodiment detects the congestion condition while determining a shutdown of warning, it is possible to reduce the number of times in transmitting control signals between the base station 20 and the MME 30. Thus, it is possible to efficiently use resources with the base station 20 and the MME 30. Since the base station 20 of the third embodiment determines a shutdown of warning in a dispersive manner, it is possible to reduce the processing load of the MME 30.

Fourth Embodiment

In the first and second embodiments, the base station 20 detects the congestion condition while the MME 30 determines a shutdown of warning. In the fourth embodiment, the MME 30 detects the congestion condition of the base station 20 while determining a shutdown of warning. Hereinafter, the feature of the fourth embodiment compared to the first and second embodiments will be described.

Figure 13:
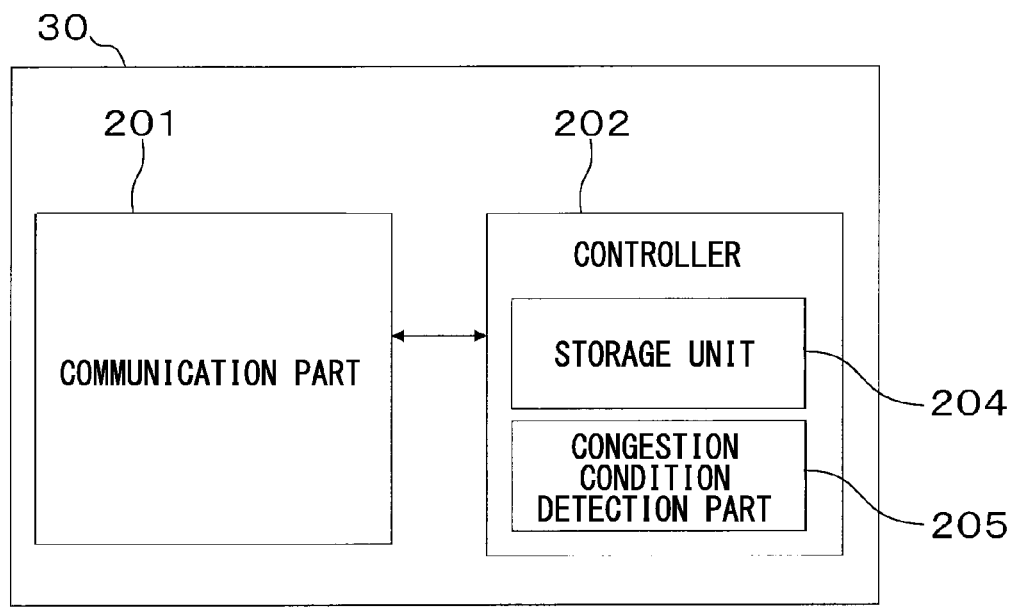
FIG. 13 is a block diagram of an MME according to the fourth embodiment of the present invention.

FIG. 13 is a block diagram of the MME 30 according to the fourth embodiment of the present invention. The MME 30 of the fourth embodiment includes the communication part 201 and the controller 202. The controller 202 further includes a storage unit 204 and a congestion condition detection part 205. The MME 30 receives a fourth control signal representing a resource usage rate from the base station 20. The base station 20 may periodically transmit a fourth control signal to the MME 30. Alternatively, the base station may transmit a fourth control signal due to a predetermined trigger. The congestion condition detection part 205 compares the resource usage rate with the first threshold. The MME 30 determines that the base station 20 is in the congestion condition when the resource usage rate of the base station 20 is equal to or above the first threshold. Similar to the first and second embodiments, the MME 30 determines a shutdown of warning with the base station 20 in the congestion condition. It is possible to employ the same method of determining a shutdown of warning as the first embodiment. That is, it is possible to determine a shutdown of warning through a comparison between the second threshold and the warning information representing a priority on an emergency of warning. Additionally, it is possible to incorporate the resource usage rate calculation part 103 and the congestion condition calculation part 104, included in the base station 20 of the second embodiment, into the MME 30 of the fourth embodiment. In this case, the MME 30 determines a shutdown of warning in consideration of the resource usage rate for each warning and the amount of resources to be reduced due to warning shutdown.

Figure 14:
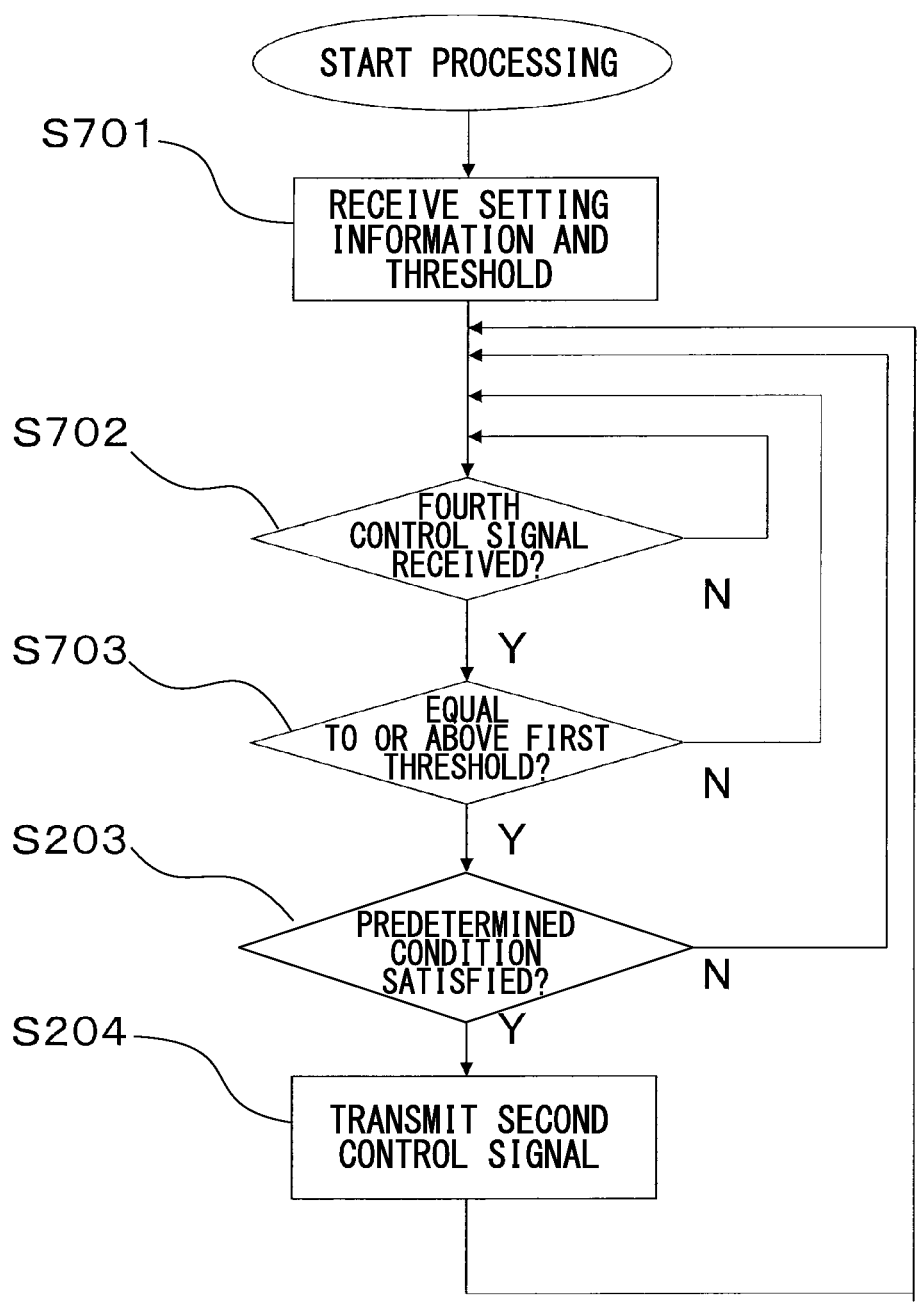
FIG. 14 is a flowchart showing the operation of the MME according to the fourth embodiment.

Next, the operation of the MME 30 of the fourth embodiment will be described with reference to FIG. 14. FIG. 14 includes the same steps as steps S203 and S204 in FIG. 5. The MME 30 of the fourth embodiment detects the congestion condition while determining a shutdown of warning, and therefore the MME 30 receives the warning information (or the setting information), the first threshold, and the second threshold from the upper device such as the CBC 40 in step S701. It is possible for the upper device to determine the setting information once the MME 30 starts its operation. Alternatively, it is possible to determine the setting information when starting each individual communication. In step S702, the MME 30 determines whether or not to receive a fourth control signal representing a resource usage rate from the base station 20. Upon receiving the fourth control signal (i.e. a decision result "Y" of step S702), the MME 30 compares the resource usage rate of the base station 20 with the first threshold (step S703). When it is determined that the base station 20 is in the congestion condition while the resource usage rate of the base station 20 is equal to or above the first threshold (i.e. a decision result "Y" of step S703), the MME 30 determines that the warning information and the second threshold satisfy the predetermined condition (step S203). The flow returns to step S702 when the MME 30 fails to receive a fourth control signal (i.e. a decision result "N" of step S702) or when the resource usage rate of the base station 20 is less than the first threshold (i.e. a decision result "N" of step S703). Additionally, the flow returns to step S702 when the warning information and the second threshold do not satisfy the predetermined condition (i.e. a decision result "N" of step S203). In this connection, steps S203 and S204 are identical to those of the first and second embodiments.

As described above, the MME 30 of the fourth embodiment detects the congestion condition of the base station 20 while determining a shutdown of warning; hence, it is possible to reduce the number of times in transmitting control signals between the base station 20 and the MME 30. Thus, the fourth embodiment can efficiently use resources in the base station 20 and the MME 30. Additionally, the fourth embodiment is designed such that the MME 30 detects the congestion condition of the base station 20 in a concentrated manner; hence, it is possible to reduce the processing load of the base station 20.

Fifth Embodiment

The third and fourth embodiments fixedly set the second threshold irrespective of the resource usage rate of the base station 20, but the fifth embodiment sets the second threshold depending on the resource usage rate of the base station 20. Hereinafter, the feature of the fifth embodiment compared to the third and fourth embodiments will be described.

The process of setting the second threshold depending on the resource usage rate of the base station 20 of the fifth embodiment will be described below. A shutdown of warning is determined through a comparison between the warning information and the second threshold in the congestion condition of the base station 20, wherein the second threshold is automatically set in response to the resource usage rate used for determining the congestion condition. FIG. 15 is a table showing the relationship between the resource usage rate and the second threshold. The table of FIG. 15 is stored in the storage unit 106 of the base station 20. The warning information refers to a priority on an emergency of warning, wherein the lowest priority is set to "0" while the highest priority is set to "5". When the resource usage rate of the base station 20 is 70%, for example, the second threshold is set to "3". In this case, the base station 20 determines a shutdown of warning with respect to a warning having a priority of "2" or less. In this connection, the table of FIG. 15 is illustrative and not restrictive.

It is possible for the upper device such as the MME 30 to provide the base station 20 with the table showing the relationship between the resource usage rate and the second threshold. Alternatively, it is possible for the base station 20 to store the table in advance. When the upper device sets the table to the base station 20, it is possible to set the table once the base station 20 starts its operation. Alternatively, it is possible to set the table when starting each individual communication.

In the above, the table is stored in the base station 20, but it is possible to store the table in the MME 30. In this case, the table of FIG. 15 is stored in the storage unit 204 of the MME 30. Herein, the upper device may set the table to the MME 30. Alternatively, the MME 30 may store the table in advance. When the upper device sets the table to the MME 30, it is possible to set the table to the MME 30 once the MME 30 starts its operation. Alternatively, it is possible to set the table to the MME 30 when starting each individual communication.

As described above, the fifth embodiment automatically sets the second threshold depending on the resource usage rate of the base station 20; hence, it is possible for the base station 20 or the MME 30 to flexibly determine a shutdown of warning. Thus, the base station 20 or the MME 30 can efficiently use resources.

Sixth Embodiment

The first to fifth embodiments fixedly set the second threshold irrespective of the type of the base station 20, but the sixth embodiment determines the second threshold based on the type of the base station 20. Hereinafter, the feature of the sixth embodiment compared to the third and fifth embodiments will be described.

The process of setting the second threshold based on the type of the base station 20 of the sixth embodiment will be described below. Herein, a shutdown of warning is determined through a comparison between the warning information and the second threshold in the congestion condition of the base station 20, wherein the second threshold is determined based on the type of the base station 20. FIG. 6 is a table showing the relationship between the second threshold and the type of the base station 20. The table is stored in the storage unit 106 of the base station 20 (see FIG. 11). The warning information refers to a priority on an emergency of warning, wherein the lowest priority is set to "0" while the highest priority is set to "5". There are provided various type of the base station 20 such as a macro base station configuring a macro-cell, a pico base station configuring a pico-cell, and a femto base station configuring a femto-cell. The femto base station refers to HNB (Home Node B) or HeNB (Home eNode B). The sixth embodiment determines the second threshold based on the type of the base station 20. When the base station 20 is a pico base station, for example, the second threshold is set to "3". Thus, the base station 20 determines a shutdown of warning with respect to any warnings having a priority of "2" or less. In this connection, the table of FIG. 16 is illustrative and not restrictive.

It is possible for the upper device such as the MME 30 to set the table representing the relationship between the second threshold and the type of the base station 20. Alternatively, it is possible for the base station 20 to store the table in advance. When the upper device sets the table to the base station 20, it is possible to set the table once the base station 20 starts its operation. Alternatively, it is possible to set the table when starting each individual communication.

In the above, the base station 20 is configured to set the second threshold based on the type thereof, but it is possible for the MME 30 to set the second threshold. In this case, the table of FIG. 16 is stored in the storage unit 204 of the MME 30 (see FIG. 13). Additionally, it is possible for the upper device to set the table to the MME 30. Alternatively, it is possible for the MME 30 to store the table in advance. When the upper device sets the table to the MME 30, it is possible to set the table once the MME 30 starts its operation. Alternatively, it is possible to set the table when starting each individual communication.

As described above, the sixth embodiment is designed to set the second threshold based on the type of the base station 20; hence, it is possible for the base station 20 or the MME 30 to flexibly determine a shutdown of warning. Thus, the base station 20 or the MME 30 can efficiently use resources. For example, micro base stations and pico base stations with coverage areas narrower than those of macro base stations may not draw an advantage from the operation of repeatedly notifying warnings with a low priority. In this case, it is possible to set the micro base stations and pico base stations such that they do not repeatedly notify warnings with a low priority.

It is possible to control the operation of the communication system according to the first to sixth embodiments by use of the CPUs installed in the foregoing devices (i.e. the base station 20 and the MME 30) shown in FIGS. 2 and 3 or other devices capable of communicating with the foregoing devices. In this case, it is necessary to prepare storage media storing program codes of software, implementing the functions of the foregoing embodiments, and therefore the CPU of each device may read program codes, stored in storage media, so as to execute the operation of each embodiment. As storage media providing programs, for example, it is possible to use CD-ROM, DVD-R, optical disks, magnetic disks, and non-volatile memory cards. In this case, the base stations 20 according to the first to fifth embodiments differ from the base station 20 of the sixth embodiment in that it is unnecessary to limit the types of the base stations 20.

Lastly, the present invention is not necessarily limited to the first to sixth embodiments, and therefore the present embodiment may embrace any design changes or modifications that fall within the scope of the invention as defined by the appended claims.

INDUSTRIAL APPLICABILITY

The present invention provides a communication device and a communication control method applicable to warning systems providing warnings to mobile stations, wherein the present invention is applicable to any communication system which can control communication between base stations and mobile stations.

REFERENCE SIGNS LIST 10 mobile station
20 base station
30 MME
40 CBC
50 CBS
101 communication part
102 controller
103 resource usage rate calculation part
104 congestion condition calculation part
105 warning shutdown determination part
106 storage unit
201 communication part
202 controller
203 warning shutdown determination part
204 storage unit
205 congestion condition detection part The invention claim is:

1. A warning communication system, comprising:
an upper device;
a mobile station; and
a base station configured to transmit warning information from the upper device to the mobile station the base station being configured to determine a congestion condition by comparing a first threshold provided by the upper device with a resource usage rate or an amount of resources and to thereby notify the upper device of the congestion condition,
wherein the upper device is configured to determine a shutdown of each warning provided to the mobile station by comparing the warning information with a second threshold in the congestion condition.

2. The warning communication system according to claim 1, wherein the warning information indicates an arbitrary priority for each warning or an arbitrary transmission time of each warning in comparison with the second threshold indicating a predetermined priority or a predetermined transmission time.

3. The warning communication system according to claim 1, wherein the second threshold increases as the resource usage rate increases in accordance with a relational table which is determined in advance.

4. The warning communication system according to claim 1, wherein the second threshold increases as the base station decreases in coverage in accordance with a relational table which is determined in advance.

5. The warning communication system according to claim 4, wherein the relational table refers to the base station with the coverage selected from among a macro cell, a micro cell, a pico cell, and a femto cell.

6. The warning communication system according to claim 1, wherein the upper device is a mobility management entity (MME) transferring the warning information to the base station.

* * * * *